May 5, 1964 A. E. LEFEVRE 3,132,300
PORTABLE TRANSISTORIZED TRANSCEIVER APPARATUS
Filed Aug. 7, 1961
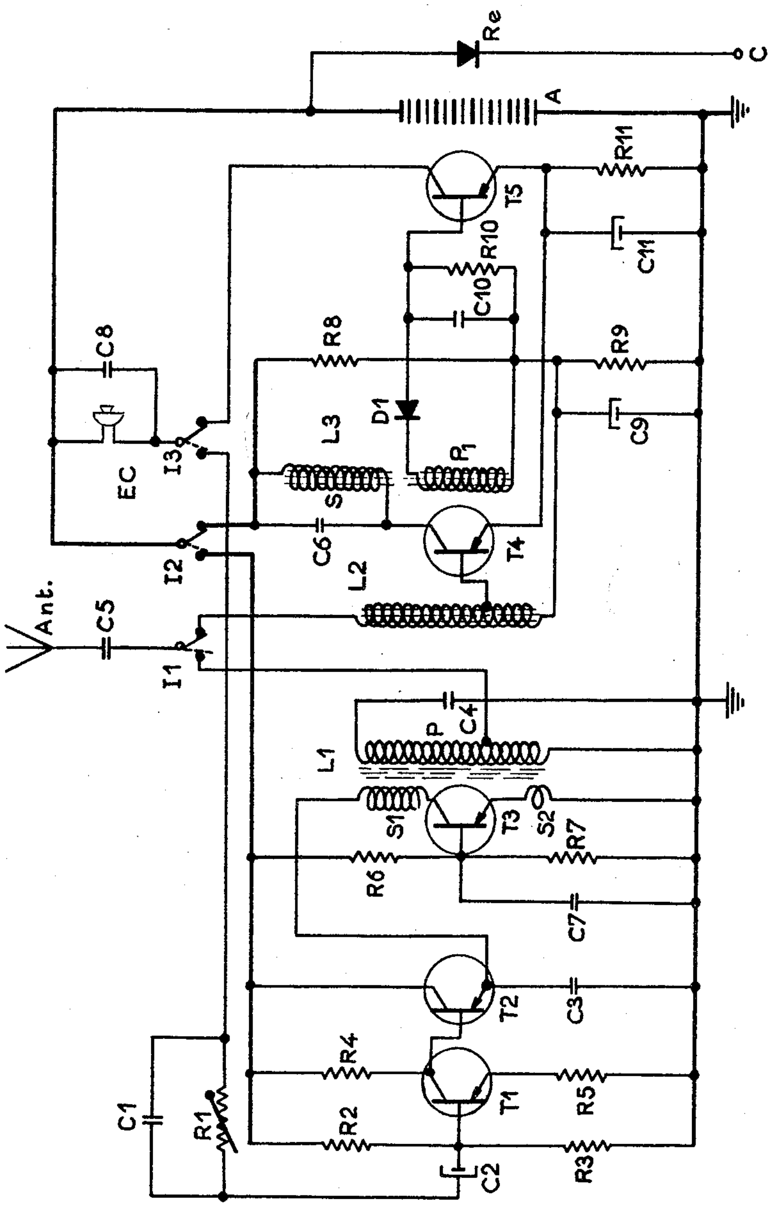
Inventor:
ALBERT E. LEFEVRE
By Karl W. Flocks
Attorney

United States Patent Office 3,132,300

Patented May 5, 1964

3,132,300

PORTABLE TRANSISTORIZED TRANSCEIVER APPARATUS

Albert E. Lefevre, Verneuil-en-Halatte, Oise, France, assignor to Charbonnages de France, Paris, France, a public institution of France Filed Aug. 7, 1961, Ser. No. 129,772
Claims priority, application France Aug. 26, 1960
5 Claims. (Cl. 325—16)

The present invention relates to a transistorized radiophonic device for transmission by amplitude modulation. It also relates to transmission/receiving apparatus using this device.

Transistorized transmission circuits which produce high-frequency voltages modulated in amplitude by a signal of lower fundamental frequency are known.

Generally, these circuits comprise a high-frequency oscillator including one or more transistors and a modulation amplifier also including one or more transistors.

Circuits of this type are known wherein the connection between the high-frequency oscillator and the modulation amplifier is achieved by putting the final transistor of the amplifier in series with the oscillator supply.

But this type of circuitry has the drawback of a poor output in the final transistor of the amplifier because it is operated with a low emitter-collector voltage. Moreover, the modulation characteristic is not linear by reason of the variations in impedance presented by the oscillator during modulation.

The object of this invention is to provide a new transistorized transmitter free from these drawbacks.

In the transmission device according to the invention, the oscillator inlet transistor is connected in such a way that it forms a part of the emitter load of the final transistor in the modulator stage, the remainder of the load impedance consisting of passive circuit elements.

According to a further feature, the passive circuit elements are inductances and/or linear or non-linear resistors, and/or series and/or parallel-connected capacitors.

According to a further feature, the microphonic voltage is amplified by a transistor stabilized in such a way that it clamps the continuous potentials of the transistors in the amplifier/modulator stage to which it belongs.

It will be seen that the device described has a low outlet impedance at the modulator stage, so that the impedance variations from the oscillator do not influence the modulation characteristic which remains linear. A further advantage is that the transistors operate with emitter-collector voltages which locate their operating points in the linear regions of their characteristics.

Other advantages and features of the invention will become clear from the following description given in respect of the accompanying drawing, the single figure of which is the circuit diagram of a portable transmitter/receiver provided with the transmission device according to the invention.

This transmitter/receiver usually comprises:

A transmission device; a receiving device and a supply and switching system.

The transmission device proper comprises:

(*a*) An oscillator stage of the Hartley type, built around a transistor $T_3$, the oscillation coil $L_1$ of which includes three windings P, $S_1$ and $S_2$.

The winding P is tuned with a condenser $C_4$ to the desired transmission frequency.

The winding $S_1$ is series-connected with the collector of $T_3$, whereas the winding $S_2$ is series-connected with the emitter of $T_3$.

The coupling of the windings $S_1$, and $S_2$ and P enables oscillation to commence if transistor $T_3$ passes a certain current, this current being regulated by a resistor bridge $R_6$, $R_7$ on the base of $T_3$. A condenser $C_7$ connected in parallel across $R_7$ uncouples the base of transistor $T_3$ at the working frequency.

(*b*) An amplifier/modulator stage including a transistor $T_2$ with a condenser $C_3$ which forms the additional load impedance of the emitter of this transistor which constitutes a final modulation transistor. A portion of the emitter load of this transistor is in fact comprised by the inlet transistor $T_3$ of the oscillator. The base of transistor $T_2$ has its potential clamped by a transistor $T_1$ whose collector is connected to the supply battery A through a switch $I_2$.

The transistor $T_1$ receives and amplifies the microphonic current. It is associated with a resistor base bridge $R_2$, $R_3$ which clamps the continuous potentials of $T_1$ and $T_2$; a load resistor $R_4$ at the collector regulates the gain of $T_1$ and a resistor $R_5$ at the emitter of $T_1$ enables its gain to be stabilized as a function of the temperature.

(*c*) A microphonic stage comprised by a microphone EC shunted by a condenser $C_8$ and switched by a switch $I_3$, the resistor $R_1$-condenser $C_1$ connection enabling the microphonic current and the microphone response curve to be adjusted. A condenser $C_2$ ensures the connection between the microphone EC and $T_1$ while blocking the continuous potentials.

The receiving device proper comprises:

(*a*) An input circuit, for example, aperiodic, consisting of an inductor $L_2$ connected on one side with the coupler and, on the other side, with the base of a transistor $T_4$.

(*b*) An input stage comprising the transistor $T_4$, the collector of which is connected with the winding S of a transformer $L_3$ tuned by a capacitor $C_6$ and having its winding $P_1$ connected with the detecting circuit.

(*c*) The detection constituted by the winding $P_1$ of transformer $L_3$ connected with a diode $D_1$, the circuit of the secondary being closed by a circuit comprising a resistor $R_{10}$ and a capacitor $C_{10}$.

(*d*) A transistor $T_5$ which constitutes the low-frequency stage of the receiver and amplifies the voltage detected. The disc EC, operating as a phone, acts directly as a load for the collector of transistor $T_5$ when the switch $I_3$ is in its receiving position.

In view of the diversity of possible couplings, the gain of the input transistor $T_4$ must be reduced as the amplitude of the signal received increases, and this automatically. This automatic gain control is achieved by directly connecting the emitters of transistors $T_4$ and $T_5$ in such a way as to cause $T_5$ to amplify the voltages detected and so as to cause a sliding voltage, capable of varying the current of transistor $T_4$, to appear across the terminals of the circuit $R_{11}$—$C_{11}$. Since, on the other hand, the potential at the base of transistor $T_4$ is rigidly clamped by the resistor bridge $R_8$ and $R_9$, the gain of $T_4$ varies as a function of the current passing through $T_5$.

The supply is provided by an accumulator or battery A. The positive terminal of A is earthed. A rectifier R*e* is incorporated in the apparatus so as to be able to recharge the accumulator A should A indeed be an accumulator.

Receive/transmit switching is effected by the interconnected switches $I_1$, $I_2$, $I_3$, the aerial A*nt* being connected to the switch $I_1$ through a capacitor $C_5$.

It is to be understood that the invention has been described and illustrated merely by way of explanation and without any intention of limitation and that various modifications of detail can be made therein without exceeding its scope.

I claim:

1. Circuitry for a transistorized transmission-receiving apparatus comprising transmitting means, receiving means, and a power supply in a circuit relationship; switching means having at least two positions connecting said transmitting means to said power supply in one position and said receiving means to said power supply in another position; said transmitting means including an amplifier-modulator stage having an output transistor, said output transistor comprising an emitter, a collector, and a base; and a load means connected to said emitter comprising an input transistor of an oscillator stage and passive circuit elements.

2. The circuitry of claim 1 further characterized by an input transistor in said amplifier-modulator stage connected directly to said output transistor of said amplifier-modulator stage, said input transistor in said amplifier-modulator stage having a base, a collector, and an emitter; and a resistor bridge connected to said base of said input transistor in said amplifier-modulator stage whereby the D.C. potentials of said input transistor and said output transistor in said amplifier-modulator stage are held at a fixed value by means of said resistor bridge.

3. The circuitry of claim 1 further characterized by an input transistor in said amplifier-modulator stage connected directly to said output transistor in said amplifier-modulator stage.

4. The circuitry of claim 1 further characterized by said amplifier-modulator stage including an input transistor, said input transistor in said amplifier modulator stage having a base, a collector, and an emitter; and a resistor bridge connected to said base of said input transistor in said amplifier-modulator stage whereby the D.C. potentials of said input transistor and said output transistor in said amplifier-modulator stage are held at a fixed value by means of said resistor bridge.

5. The circuitry of claim 1 further characterized by an input transistor in said amplifier-modulator stage connected directly to said output transistor of said amplifier-modulator stage, said input transistor in said amplifier-modulator stage having a base, a collector, and an emitter; and an impedance means connected to said base of said input transistor in said amplifier-modulator stage whereby the D.C. potentials of said input transistor and said output transistor in said amplifier-modulator stage are held at a fixed value by means of said impedance means.

References Cited in the file of this patent

UNITED STATES PATENTS 2,935,606 Harrison et al. ---------- May 3, 1960

FOREIGN PATENTS 1,228,174 France --------------- Mar. 14, 1960